United States Patent [19]

Iwamoto et al.

[11] Patent Number: 5,138,361
[45] Date of Patent: Aug. 11, 1992

[54] ELECTRONIC FLASH CONTROL DEVICE EMPLOYING A PLURALITY OF CONTROL SIGNALS

[75] Inventors: Shigeru Iwamoto; Isamu Hashimoto, both of Tokyo, Japan

[73] Assignee: Asahi Kogaku Kogyo K.K., Tokyo, Japan

[21] Appl. No.: 712,998

[22] Filed: Jun. 10, 1991

Related U.S. Application Data

[63] Continuation of Ser. No. 327,674, Mar. 23, 1989, abandoned.

[30] Foreign Application Priority Data

Mar. 31, 1988 [JP] Japan ............................. 63-43118[U]

[51] Int. Cl.⁵ ............................................. G03B 15/05
[52] U.S. Cl. .................................. 354/417; 315/241 P
[58] Field of Search ................... 354/416, 417, 145.1, 354/149.11; 315/151, 156-159, 241 P

[56] References Cited

U.S. PATENT DOCUMENTS

| | | | |
|---|---|---|---|
| 3,714,443 | 1/1973 | Ogawa | 354/417 X |
| 3,726,197 | 4/1973 | Hasegawa et al. | 354/417 |
| 3,727,100 | 4/1973 | Kuraishi et al. | 354/417 X |
| 3,974,419 | 8/1976 | Adams, Jr. et al. | 354/145.1 X |
| 4,164,686 | 8/1979 | Vital et al. | 354/417 X |
| 4,208,617 | 6/1980 | Schneider | 354/417 X |
| 4,228,381 | 10/1980 | Hasegawa | 354/416 X |
| 4,340,287 | 7/1982 | Yamamoto | 354/149.11 X |
| 4,366,501 | 12/1982 | Tsunekawa et al. | 354/416 X |
| 4,509,844 | 4/1985 | Takematsu | 354/416 |
| 4,697,907 | 10/1987 | Terui et al. | 354/416 |

FOREIGN PATENT DOCUMENTS

| | | |
|---|---|---|
| 275089 | 7/1988 | European Pat. Off. ........ 354/149.11 |
| 54-70825 | 6/1979 | Japan . |
| 60-118897 | 8/1985 | Japan . |

Primary Examiner—W. B. Perkey
Attorney, Agent, or Firm—Sughrue, Mion, Zinn, Macpeak & Seas

[57] ABSTRACT

An electronic flash control device makes sure that the emission of light of an electronic flash is not impaired by a noise component signal prior to generation of a suitable quantity of light by the flash. A trigger signal is applied by the control device to allow the flash to emit light. An enable signal is supplied to a quenching circuit a predetermined time after the noise of the trigger signal has been produced. When the quantity of light from an object to be photographed by the camera reaches a certain value and the enable signal occurs, the quench circuit suppresses the emission of light by the electronic flash.

17 Claims, 6 Drawing Sheets

FIG. 3(A) SWX
FIG. 3(B) X_TRIG
FIG. 3(C) S_X
FIG. 3(D) S_S
FIG. 3(E) S_I
FIG. 3(F) Q_U
FIG. 3(G)
FIG. 3(H) S_E

ELECTRONIC FLASH CONTROL DEVICE EMPLOYING A PLURALITY OF CONTROL SIGNALS

This is a continuation of application Ser. No. 07/327,674 filed Mar. 23, 1989 abandoned.

BACKGROUND OF THE INVENTION

The present invention relates to an electronic flash control device for a TTL light control type camera, and more particularly to an electronic flash control device which is free from the difficulty that light emission by the electronic flash is stopped by a noise component occurring before a suitable quantity of output light is obtained.

When it is necessary to photograph an object having a low luminance or to correct the amount of exposure, an electronic flash is generally used to increase the luminance of the object. The electronic flash is either built into the camera or is provided separately and can be connected to the camera. Whether the electronic flash is built into the camera or provided separately from the camera, it is essential to control the light emitting conditions of the electronic flash so that the amount of light applied to the object by the electronic flash has a predetermined value. In order to meet this requirement, the camera is provided with an electronic flash control device.

Figure 4:
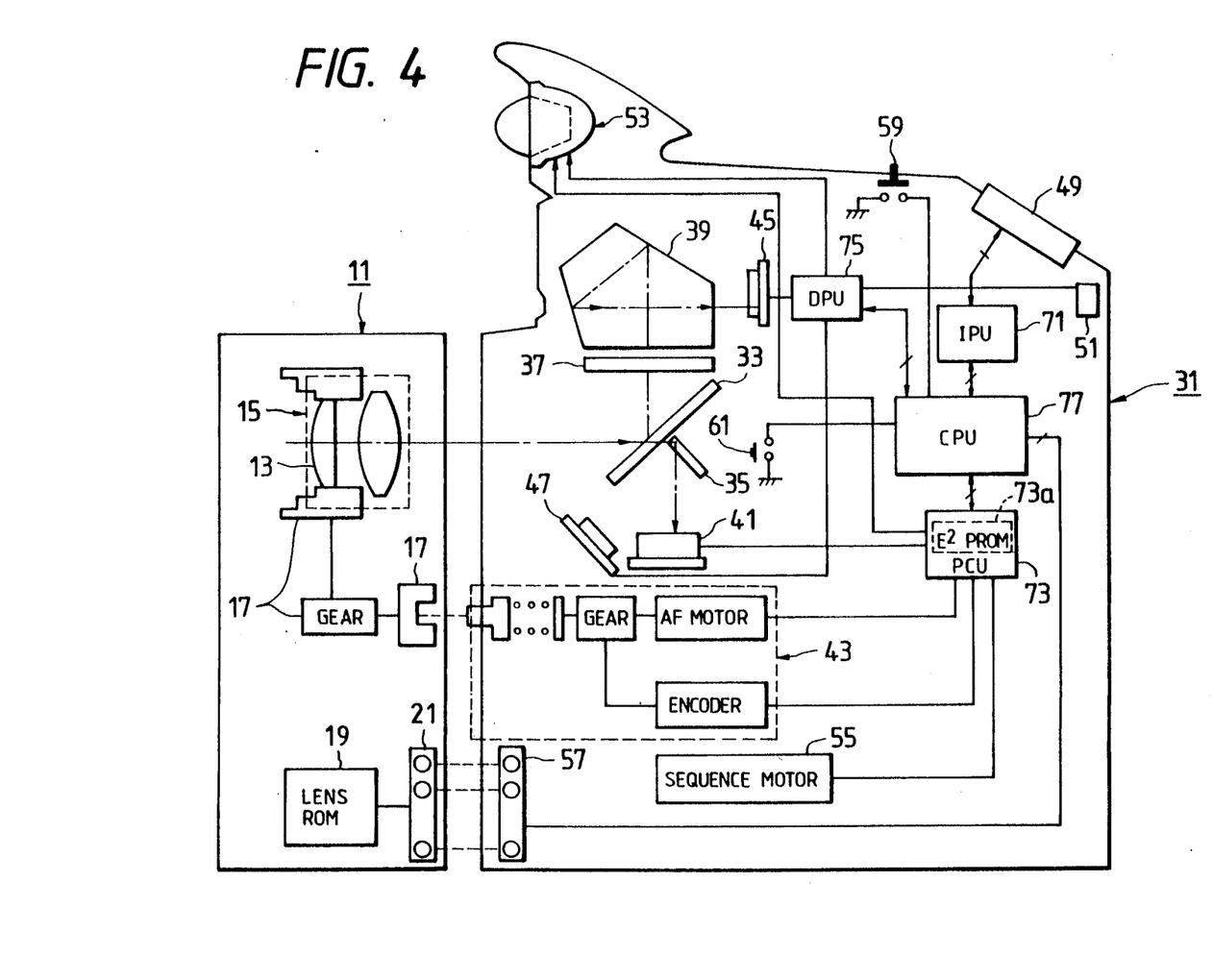
FIG. 4 is an explanatory diagram for a description of the arrangement of a camera to which the electronic flash control device of the present invention is applied.

The electronic flash control device will be described with reference to a TTL light control type camera employing an electronic flash. FIG. 4 shows an example of a camera of this type. More specifically, FIG. 4 is a block diagram outlining the arrangement of a camera having an automatic focusing (AF) function and a built-in electronic flash proposed by the present applicant.

First, the arrangement of the camera shown in FIG. 4 will briefly be described. In FIG. 4, reference numeral 31 designates a camera body, and 11 represents a photographic lens mounted on the camera body 31.

The photographic lens 11 includes a lens system 15 including a focusing lens 13 which is movable along the optical axis and contributes to the focusing operation, and a drive force transmitting mechanism 17 for transmitting a drive force from a drive source provided for the camera body 31 to the movable lens 13. The photographic lens 11 further includes a lens ROM (read-only memory) 19 storing aperture value data of the photographic lens, position data of the movable lens 13, and data as to whether or not operating the electronic flash built into the camera body is suitable for the photographic lens, and a group of electrical contacts 21 which are connected to electrical contacts 57 on the camera body 31.

On the other hand, the camera body 31 includes an optical system having a main mirror 33, an auxiliary mirror 35, a focusing screen 37, and a pentagonal prism 39, an image pickup section 41 used for an automatic focusing operation, a drive mechanism 43 for driving the movable lens 13 in the photographic lens 11, a light detecting element 45 used for automatic exposure (AE) control for the purpose of TTL light control, a light detecting element 47 operated when the electronic flash is used, a central display section 49 for displaying camera conditions, a display unit 51 provided in the viewfinder for indicating an AF or AE mode, the built-in electronic flash 53, a sequence motor 55 for winding or rewinding the film, a group of electrical contacts 57 provided on the side of the camera body which are connected to the group of electrical contacts 21 on the side of the photographic lens, a release switch 59, and a synchronizing contact 61 such as an X contact.

The camera body 31 further includes a microcomputer, namely, an IPU (indication processing unit) 71 for controlling the central display section 49, a PCU (power control unit) 73 having an $E^2PROM$ 73a for interfacing with the image pickup section 41 and controlling the sequence motor 55 and an AF motor 43, the lens stop and the shutter release magnet, another microcomputer, namely, a DPU (data processing unit) 75 for performing photometric arithmetic operations and controlling the display unit 51 in the viewfinder, etc., and a central control microcomputer, namely, a CPU (central processing unit) 77. The CPU 77 controls the IPU 71, the PCU 73, the DPU 75, and the lens ROM 19 in the photographic lens 11.

The above-described built-in electronic flash 53 is provided above the pentagonal prism 39 and substantially at the middle of the camera body 31 so that the light flash can be readily applied to an object. When the electronic flash 53 is not in use, its light flash emitting section is retracted into the camera body. When it is in use, the light flash emitting section is protruded therefrom by operating a push button (not shown). The camera is designed so that an auxiliary electronic flash can be additionally connected thereto.

Figure 5:
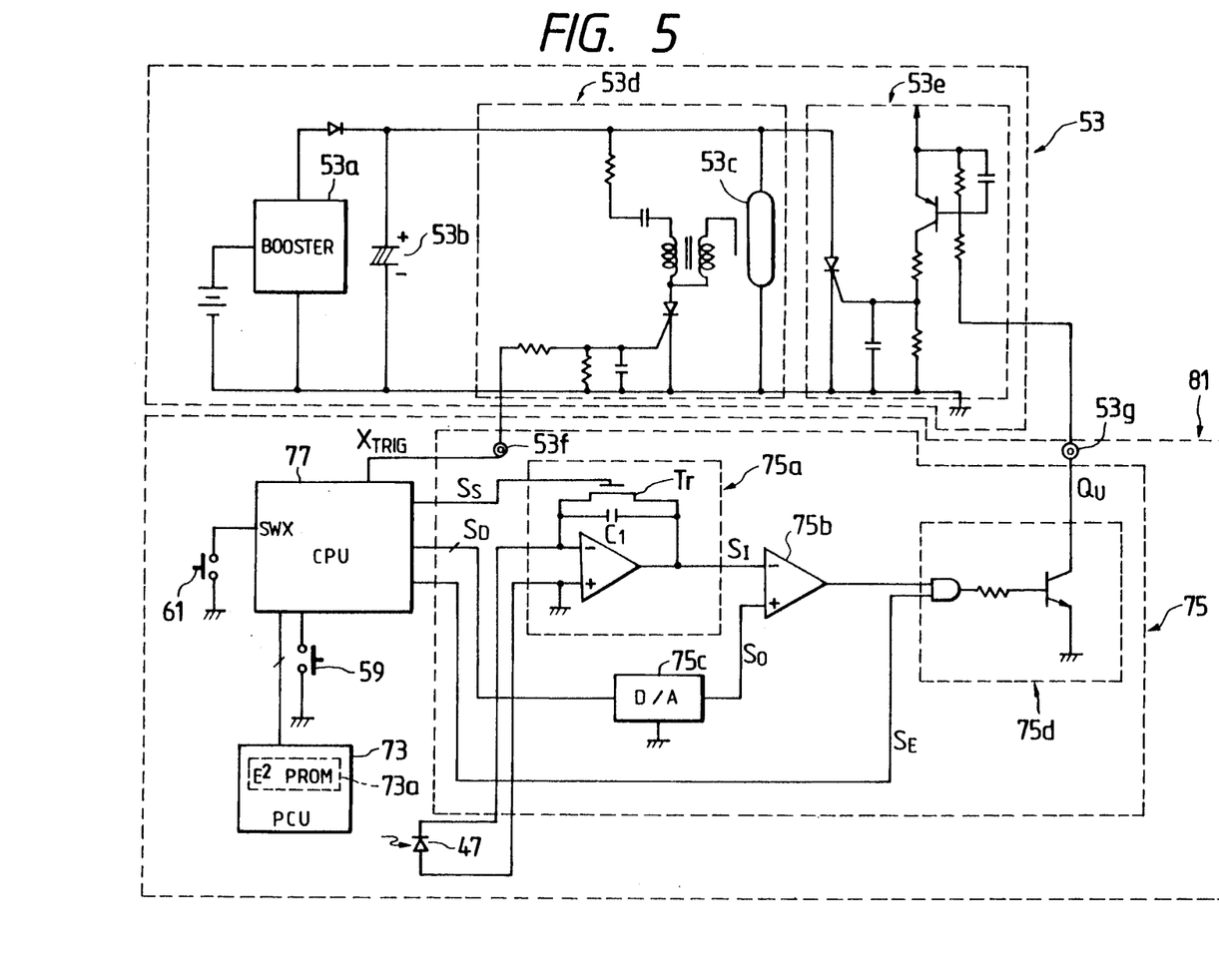
FIG. 5 is a circuit diagram, partly as a block diagram, for a description of the operation of the electronic flash control device according to the present invention.

Next, an electronic flash control device for the above-described camera will be described. FIG. 5 is a diagram showing the above-described electronic light flash 53 and the electronic flash control device in detail. In FIG. 5, reference numeral 81 designates the electronic flash control device. The device 81 includes as essential components the CPU 77, the DPU 75, the PCU 73, the light detecting element 47, the release switch 59 and the X contact 61. The electronic flash 53 includes a booster circuit 53a, a main capacitor 53b, a light emitting circuit 53d having a light emitting tube 53c, and a light emission stopping circuit 53e. The electronic flash 53 is connected to the electronic flash control circuit 81 through a trigger signal terminal 53f and a quench signal terminal 53g. When necessary, the aforementioned auxiliary electronic flash is connected to the electronic flash control circuit 81 through auxiliary electronic flash connecting contacts corresponding to the above-described contacts 53f and 53g which are provided at predetermined positions on the camera body 31.

The operation of the electronic flash control device 81 thus constructed will be described with reference to the timing diagrams shown in FIGS. 6(A) through 6(J).

The release switch 59 is turned on after the camera has selected the electronic flash operation mode. Then, the CPU 77, after carrying out a series of processing operations, starts detecting the variation of the voltage at the X contact. In response to the variation of the voltage at the X contact (SWX in FIG. 6(A)) which occurs when the shutter is fully opened, the CPU 77 supplies a trigger signal $X_{TRIG}$ shown in FIG. 6(B) to light emitting circuit 53d in the electronic flash 53 via trigger signal terminal 53f. In response to the trigger signal, the light emitting circuit 53d supplies an electrical signal $S_X$ shown in FIG. 6(C) to the light emitting tube 53c. As a result, the light emitting tube 53c emits light. (See FIG. 6(G)).

Figure 6A:
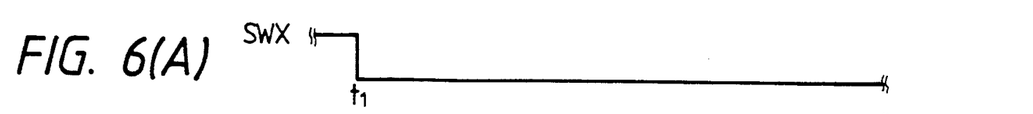
FIG. 6(A) through 6(J) are waveform diagrams used in describing the prior art.
Figures 6B, 6C:
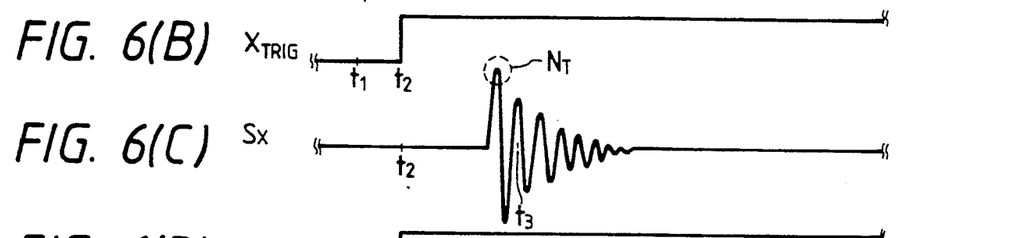
Figures 6D, 6E:
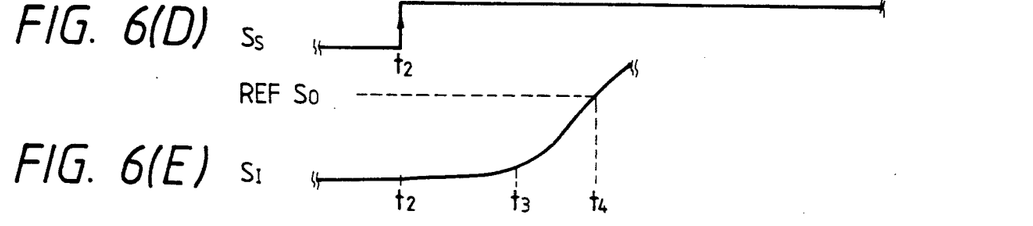

On the other hand, an integrator circuit 75a in the DPU 75 integrates the output signal of the light detecting element 47 in response to an integration start signal $S_S$ shown in FIG. 6(D) which the CPU 77 outputs in response to the trigger signal. The integration voltage $S_I$ of the integrating circuit, as shown in FIG. 6(E), gradually increases with time, and abruptly increases with the emission of light from the light emitting tube. The integration voltage $S_I$ is applied to one input terminal of a comparator 75b.

The CPU 77 applies a digital signal $S_D$ to a D/A (digital to analog) converter 75c prior to every photographing operation. The digital signal represents a suitable exposure value determined in accordance with the ISO data of the film loaded in the camera or exposure correction data when available. The digital signal $S_D$ is subjected to digital-to-analog conversion by the D/A converter 75c, the output of which is applied to the other input terminal of the comparator 75b. The output terminal of the comparator 75b is connected to one input terminal of an AND circuit in a quench signal output regulating circuit 75d in the DPU 75.

Figures 6F, 6G:
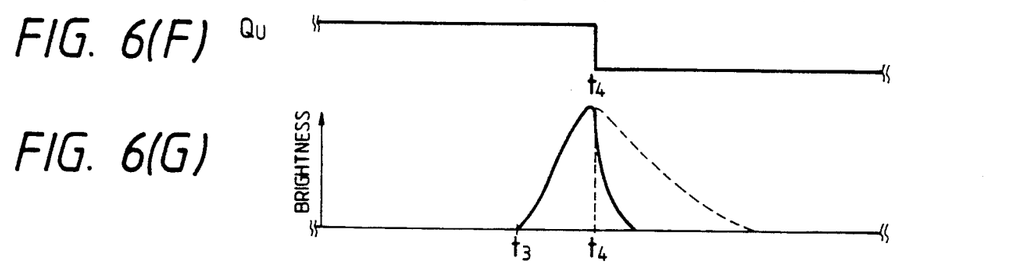

When, in the circuit thus constructed, the integration voltage $S_I$ reaches a reference value $S_O$, the comparator 75b applies a signal to the AND circuit in the quench signal output regulating circuit 75d so that the quench signal is generated (in a manner to be described in more detail later). When, with an enable signal $S_E$ applied to the other input terminal of the AND circuit by the CPU 77, the integration voltage $S_I$ reaches the reference value, the regulating circuit 75d applies a quench signal $Q_U$ shown in FIG. 6(F) to the light emission stopping circuit 53e. In response to the quench signal, the emission of light of the electronic flash 53 is quickly suppressed as shown in FIG. 6(G).

The present applicant has conducted extensive research on the electronic flash control circuit described above and recognized that the output timing of the enable signal $S_E$ is very important. That is, depending on the enable signal, the control circuit may operate erroneously.

Figure 6H:
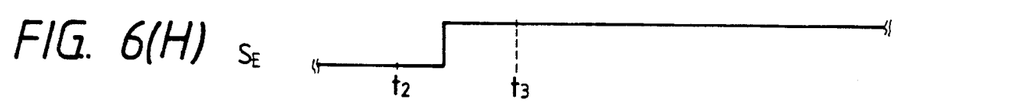
Figure 6I:
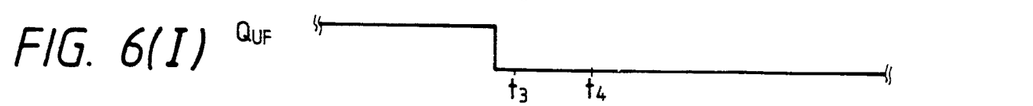
Figure 6J:
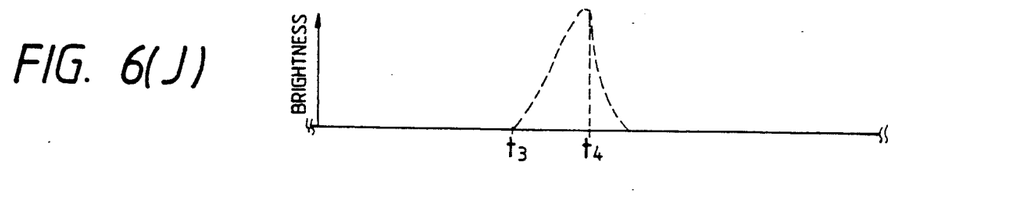

When the CPU 77 supplies the enable signal $S_E$ as shown in FIG. 6(H) to the quench signal output regulating circuit 75d before a noise pulse $N_T$ occurs within the electrical signal $S_X$ in response to the trigger signal as shown in FIG. 6(C), the circuit is operated erroneously and a false quench signal $Q_{UF}$ is produced as shown in FIG. 6(I), so that no light is emitted (See FIG. 6(J).) In practice, such noise pulses are often produced by the light emitting tube, and accordingly, in order to perform the emission of light correctly, it is essential to use a light emitting tube having excellent characteristics. As a result, during manufacture, it is necessary to perform an additional operation of selecting light emitting tubes suitable for the electronic flash control device.

In view of the foregoing, an object of the present invention is to provide an electronic flash control device which is free from the difficulty of the emission of the light flash being stopped by a noise component before a suitable amount of light is obtained.

SUMMARY OF THE INVENTION

The foregoing and other objects of the present invention have been achieved by the provision of an electronic flash control device for a TTL light control type camera comprising means for applying a trigger signal to an electronic flash to cause the electronic flash to emit light; and means for applying a quench signal to said electronic flash when, with an enable signal being supplied, the quantity of light from an object to be photographed reaches a predetermined value, which device, according to the invention, comprises means for supplying the enable signal at a predetermined time instant after a noise signal attributing to the trigger signal occurs.

In the inventive electronic flash control device, the predetermined time instant preferably occurs around the start of the emission of the light flash. It goes without saying that, when the light flash has been emitted, the time instant should occur before the output of the light detecting element which receives the light flash reaches a predetermined value (in the above-described example, the reference value $S_O$).

Further, in the electronic flash control device of the invention, the predetermined time instant preferably occurs when a predetermined period of time has passed after the generation of the trigger signal. Data for selecting the predetermined period of time is stored in an $E^2$PROM (electrically erasable programmable ROM).

In the electronic flash control device thus constructed, the enable signal can be applied to the quench signal outputting means after the noise accompanying the trigger signal is decreased, whereby erroneous operation due to the noise can be prevented.

Furthermore, the timing of production of the enable signal is determined according to the data stored in the $E^2$PROM, which can be changed with ease. Thus, changes in the timing of production of the noise, such as may occur when a light emitting tube of a different lot is used or a different model of light emitting tube is employed, can readily be accommodated.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENT

An example of an electronic flash control device constructed according to the present invention which is applied, by way of example, to a built-in electronic flash of an AF camera will be described. However, it should be noted that the invention is not limited thereto or thereby. That is, the technical concept of the invention is applicable to an AF camera connected to the auxiliary electronic flash, or to silver salt photographic cameras other than TTL light control type cameras, and to electronic still cameras.

Figure 1:
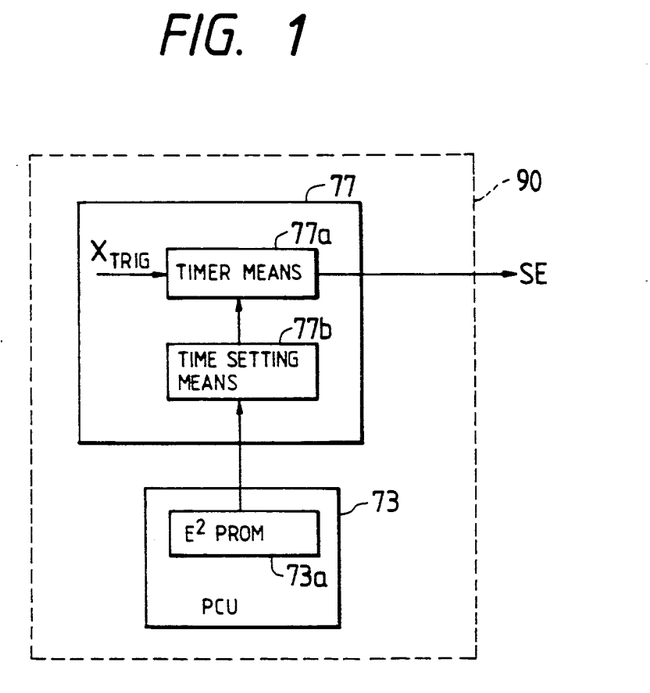
FIG. 1 is a block diagram used for a description of the function of an enable signal supplying device in an example of an electronic flash control device constructed according to the present invention.

First, various arrangements of the electronic flash control device according to the present invention will be described with reference to FIGS. 1 and 5.

A device for applying the trigger signal to the electronic flash 53 essentially includes the release switch 59, the X contact 61, and the CPU 77.

A device for applying the quench signal to the electronic flash 53 when, with the enable signal present, the quantity of light from the object reaches a predetermined value essentially includes the CPU 77, the light detecting element 47, the integrator circuit 75a, the comparator 75b, the D/A converter 75, and the quench signal output regulating circuit 75d in the DPU 75.

A device for supplying the enable signal at a predetermined time instant after the occurrence of noise in response to the trigger signal essentially includes the E$^2$PROM 73a of the PCU 73 and the CPU 77. FIG. 1 is a block diagram showing the enable signal supplying device in more detail. In FIG. 1, reference numeral 90 designates the enable signal supplying device.

The enable signal supplying device 90 utilizes a timer 77a and a time setting unit 77b included in the CPU 77. Data indicating a predetermined time period stored in the E$^2$PROM 73a of the PCU 73 is applied to the time setting unit 77b to be set in the timer 77a. In response to the trigger signal X$_{TRIG}$, the timer 77a starts counting the time thus set, and outputs the enable signal S$_E$ at the end of the time counting operation.

The data indicating the predetermined time stored in the E$^2$PROM 73a is determined through experiments depending on the type of electronic flash and light emitting tube used. The control device may be designed so that many different data timing signals may be stored in the E$^2$PROM 73a in advance. Thus, when an electronic flash is connected to the camera, the data signal corresponding to the connected electronic flash is read out.

Figure 2A:
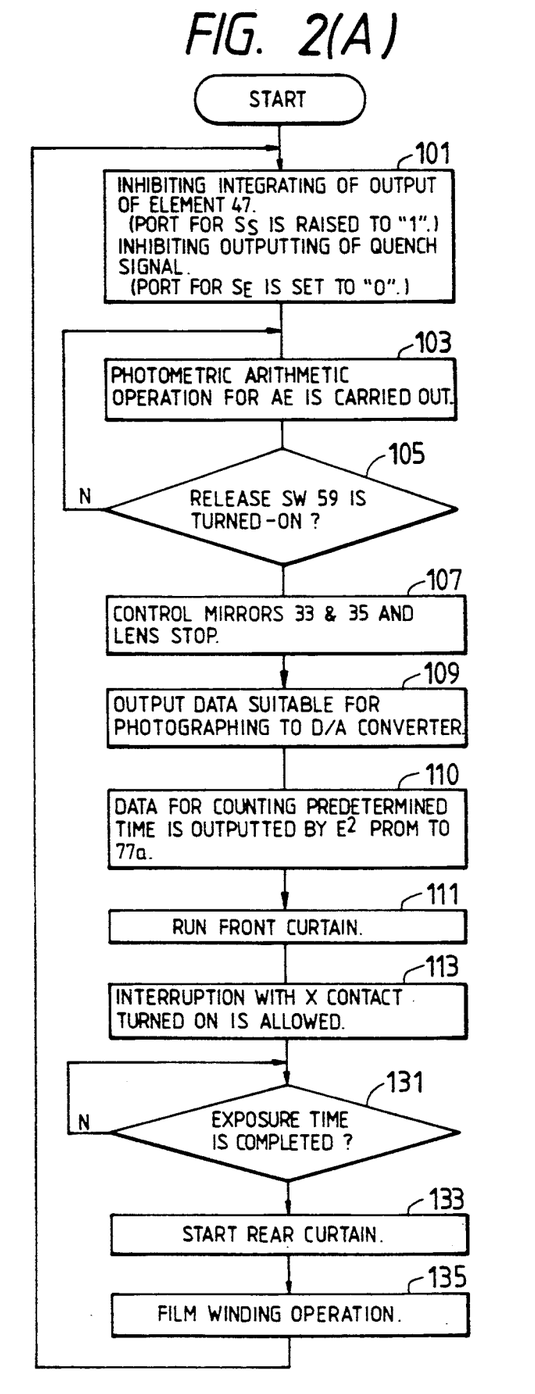
FIGS. 2(A) and 2(B) are flow charts for a description of the operation of the electronic flash control device of the present invention.
Figure 2B:
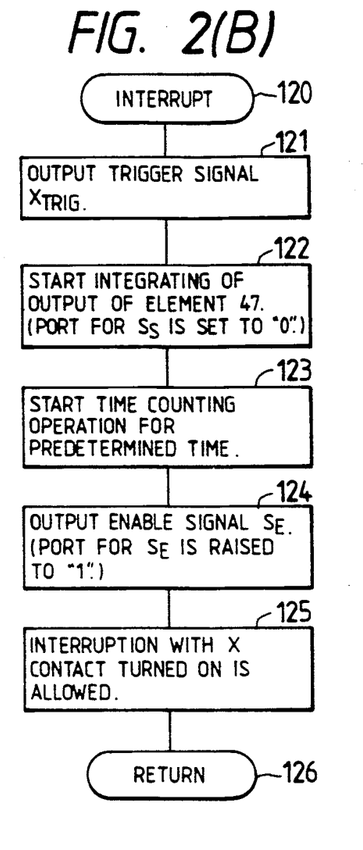

FIGS. 2(A) and 2(B) are flowcharts describing the operation of the CPU 77 which controls the trigger signal supplying device, the quench signal supplying device, and the enable signal supplying device. The operation of the electronic flash control device of the present invention will be described with reference to FIGS. 2 and 5.

First, the electronic flash control device is initialized (Step 101 in FIG. 2(A)).

The initialization is achieved by inhibiting the TTL integration, i.e., by inhibiting the integrating of the input of the light detecting element 47 and by inhibiting the outputting of the quench signal. More specifically, the integrating of the output of the light detecting element 47 is inhibited by raising the port for the integration starting signal S$_S$ of the CPU 77 to "1" so that a transistor Tr short circuits a capacitor C$_1$ in the integrating circuit 75. The outputting of the quench signal is inhibited by setting port for the enable signal S$_E$ of the CPU 77 to "0".

Thereafter, in the camera, a photometric arithmetic operation for AE (automatic exposure control) is carried out according to the program (Step 103). In this operation, a suitable shutter speed Tv and a suitable aperture value Av are determined. In addition, a data signal Sv indicating the ISO of the photographing film, and a data signal Xv indicating an exposure correction value when specified by the photographer are loaded in the CPU 77. Under this condition, the CPU 77 detects a voltage at the port to which the release switch 59 is connected. When the detected voltage is at a high level, Step 103 is repeated (Step 105). When the detected voltage is at a low level (i.e., the release switch is depressed), the CPU 77, ending the photometric arithmetic operation, controls the main mirror 33, the auxiliary mirror 35 (FIG. 4) and the lens stop (Step 107).

Then, the CPU 77 applies data to the D/A converter 75c which indicates an exposure value suitable for photographing the present frame which is determined from the data Sv, Xv, etc., corresponding to the integrated voltage of the light detecting element 47 (Step 109). In this case, the data is output as an eight-bit signal. Data for counting the predetermined time period is then output by the E$^2$PROM 73a and set in the timer 77a (Step 110).

Upon completion of the control of the mirrors and the lens stop, a magnet holding a front curtain is deenergized to run the front curtain (Step 111). An interrupt with the X contact turned on is allowed so that the signal of the X contact turned on upon completion of the running of the front curtain can be preferentially detected (Step 113). After allowing the interrupt, the CPU 77 carries out a time counting operation for controlling the exposure time (Step 131). The interrupt operation is carried out during the time counting operation.

The operation of the electronic flash control device in the interrupt processing carried out when the X contact is turned on will be described with reference to FIG. 2(B) and FIGS. 3(A) through 3(H) which are timing diagrams for the electronic flash control device of the present invention.

Figure 3A:
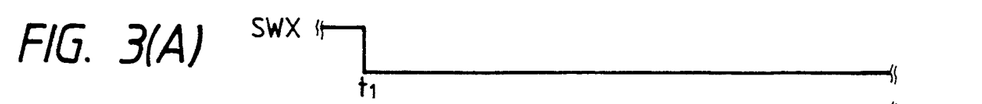
FIGS. 3(A) through 3(H) are diagrams describing the operation of the electronic flash control device of the present invention.
Figures 3B, 3C:
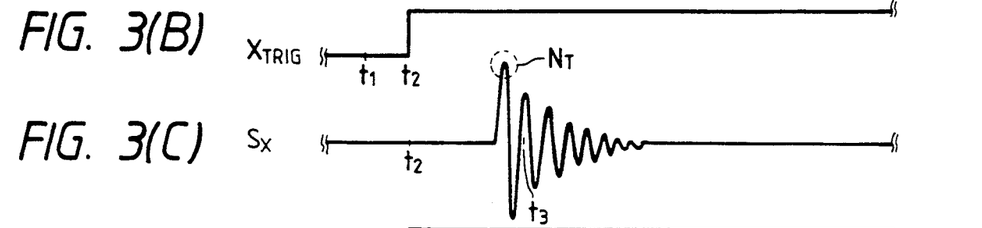

When, during the time counting operation of Step 131, an interrupt occurs with the variation of the voltage of the X contact at time t$_1$ as shown in FIG. 3(A), the CPU 77 applies a trigger signal X$_{TRIG}$ at time t$_2$ as shown in FIG. 3(B) to the light emitting circuit 53d of the electronic flash 53 (Step 121 in FIG. 2(B)). In response to the trigger signal, the light emitting circuit 53d applies an electrical signal S$_X$ as shown in FIG. 3(C) to the light emitting tube 53c. In response to electrical signal S$_X$, the light emitting tube 53c emits light as shown in FIG. 3(G).

Figures 3D, 3E:
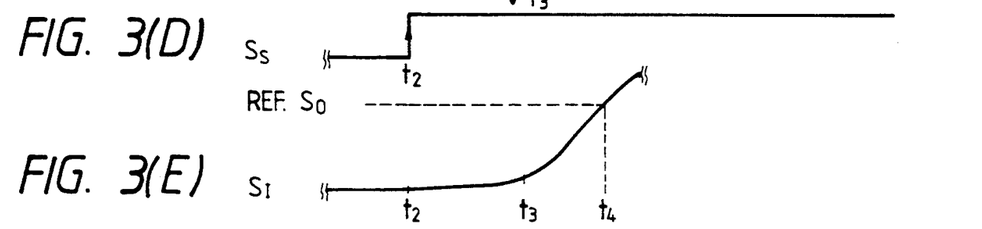

The integrating circuit 75a in the DPU 75 integrates the output signal of the light detecting element 47 in response to the integration starting signal S$_S$ output by the CPU 77 as shown in FIG. 3(D). The integrated voltage S$_I$, as shown in FIG. 3(E), gradually increases with time, and abruptly increases upon emission of the light. The integrated voltage S$_I$ is applied to one input terminal of the comparator 75b. A reference value S$_O$ indicating the amount of light suitable for the present photographing operation is applied to the other input terminal of comparator 75b. When the integrated voltage S$_I$ exceeds the reference value S$_O$, comparator 75b applies a signal to one input terminal of the AND circuit in the quench signal output regulating circuit 75d which is used to form the quench signal.

In response to the trigger signal XTRIG' the timer means 77a of the enable signal supplying device 90 (FIG. 1) starts a time counting operation (Step 123). At time t$_3$, after a predetermined time T$_O$ has elapsed since time t$_2$, the CPU applies the enable signal SE to the other input terminal of the AND circuit in the quench signal regulating circuit (Step 124).

Figures 3F, 3G:
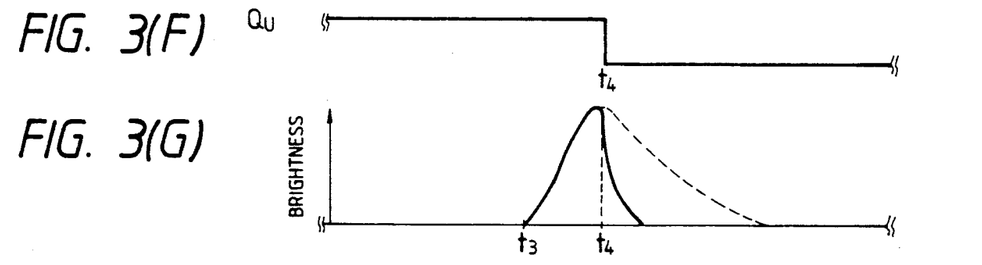
Figure 3H:
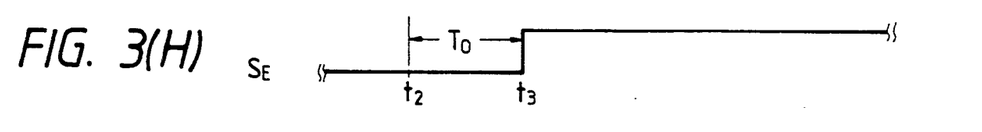

When the enable signal SE and the output signal from comparator 75b have been supplied to the AND gate as described above, the regulating circuit 75d applies the quench signal QU to the electronic flash 53 at time t$_4$ as shown in FIG. 3(F). The emission of light by the electronic flash is quickly suppressed by the quench signal QU (the solid line after time t₄ as shown in FIG. 3(G)).

Next, the CPU 77 inhibits the interrupt occurring with the X contact turned on (SWX "on") (Step 125).

A predetermined time after the release of the shutter, driving of the rear curtain is started (Steps 131 and 133 of FIG. 2(A)). Thereafter, the film is wound (Step 135). Thus, one frame of a photographing operation has been accomplished. The above-described operation is then repeated beginning with Step 101.

While the present invention has been described with reference to a preferred embodiment, it should be noted that the invention is not limited thereto or thereby.

The trigger signal outputting device, the quench signal outputting device, and the enable signal supplying device are not limited to those which have been described above, that is, they may be replaced with other suitable devices.

In the above-described embodiment, integrating the output of the light detecting element and counting the time until the production of the enable signal are started in response to the trigger signal. However, it is obvious that the start time is not always limited to when the trigger signal is provided.

As is apparent from the above description, in the electronic flash control device of the present invention, the enable signal SE can be applied to the quench signal outputting means 75d after the noise accompanying the trigger signal has dissipated, whereby erroneous operations due to the noise can be prevented. Thus, the emission of light of the electronic flash is stopped when the quantity of light received by the light detecting element has reached the predetermined value. Accordingly, the photographing operation can be achieved satisfactorily with the electronic flash.

Furthermore, the employment of the E² PROM makes it possible to readily change the timing of application of the enable signal. Hence, there is no difficulty in accommodating changes in the timing of production of the noise, such as when a light emitting tube of a different lot is used or a different light emitting tube is employed.

What is claimed is:

1. An electronic flash control device for controlling an electronic flash used with a camera, said control device comprising:
    means for applying a trigger signal to said electronic flash to allow said electronic flash to emit light;
    means for applying an enable signal at a predetermined time which occurs after a noise related to said trigger signal is produced;
    first means for generating a quench signal when a quantity of light from an object to be photographed reaches a predetermined value; and
    second means for generating a final quench signal when both said enable signal and said quench signal are received.

2. An electronic flash control device as claimed in claim 1, wherein said predetermined time occurs at approximately a first instant of said emission of light.

3. An electronic flash control device as claimed in claim 1, wherein said predetermined time occurs a predetermined time period after said trigger signal has been generated.

4. An electronic flash control device as claimed in claim 2, wherein said predetermined time occurs a predetermined time period after said trigger signal has been generated.

5. An electronic flash control device as claimed in claim 3, wherein data used to determine said predetermined time period is stored in a memory located in said camera.

6. An electronic flash control device as claimed in claim 5, wherein said memory is an electrically erasable/programmable memory.

7. An electronic flash control device as claimed in claim 4, wherein data used to determine said predetermined time period is stored in a memory located in said camera.

8. An electronic flash control device as claimed in claim 7, wherein said memory is an electrically erasable/programmable memory.

9. An electronic flash control device as claimed in claim 1, wherein said camera is a TTL light control type camera.

10. An electronic flash control device as claimed in claim 1, wherein said camera is a silver salt photographic camera.

11. An electronic flash control device as claimed in claim 1, wherein said camera is an electronic still camera.

12. An electronic flash control device as claimed in claim 1, wherein said electronic flash is built in said camera.

13. An electronic flash control device as claimed in claim 1, wherein said electronic flash is an electronic flash which is not built in said camera.

14. An electronic flash control device as claimed in claim 1, wherein said enable signal allows said quench signal to be output.

15. An electronic flash control device as claimed in claim 1, wherein said enable signal allows said final quench signal to be output.

16. An electronic flash control device as claimed in claim 1, wherein said first means comprises:
    integrating means for integrating light from said object to be photographed so as to produce a signal corresponding to said quantity of light;
    comparator means operatively coupled to said integrating means for comparing said signal corresponding to said quantity of light with said predetermined value; and wherein said second means comprises:
    logical means operatively coupled to said comparator means and receiving said enable signal.

17. An electric flash control device for controlling an electronic flash used with a camera comprising:
    means for applying a trigger signal to said electronic flash to emit light;
    means for applying an enable signal at a predetermined time which occurs after a noise related to said trigger signal is produced;
    means for integrating a quantity of light from an object to be photographed;
    means for generating a quench signal when said quantity of light reaches a predetermined value; and
    second means for generating a final quench signal when both said enable signal and said quench signal have been generated,
    said integrating means and said quench signal generating means being activated at the same time in response to said trigger signal.

* * * * *